N. HAWKINS.
BINDER.
No. 10,903. Reissued Feb. 21, 1888.
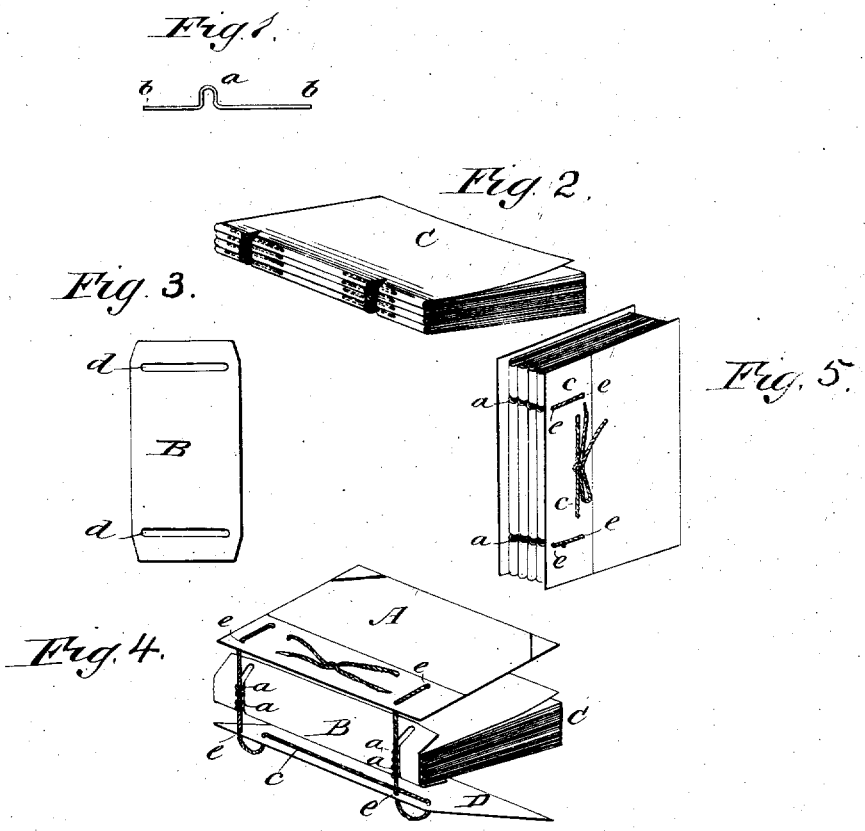
WITNESSES:
F. M. Ardle
C. Sedgwick
INVENTOR:
N. Hawkins
BY Munn & Co.
ATTORNEYS.

UNITED STATES PATENT OFFICE.

NEHEMIAH HAWKINS, OF BROOKLYN, NEW YORK.

BINDER.

SPECIFICATION forming part of Reissued Letters Patent No. 10,903, dated February 21, 1888.

Original No. 372,467, dated November 1, 1887. Application for reissue filed December 22, 1887. Serial No. 258,745.

*To all whom it may concern:*

Be it known that I, NEHEMIAH HAWKINS, of Brooklyn, in the county of Kings and State of New York, have invented a new and Improved Binder, of which the following is a full, clear, and exact description.

My invention relates to the binding of books, manuscripts, newspapers, sheet-music, or any other matter in the form of signatures that are to be associated and bound together, the objects of the invention being to improve the general appearance of the volume and give it increased strength, flexibility, and durability, and at the same time to facilitate the introduction of the signatures and the removal of the same from any part of the file without disturbing the remaining signatures, which objects I accomplish by means of the novel parts and combinations of parts to be hereinafter described, and specifically pointed out in the claims.

Reference is to be had to the accompanying drawings, forming a part of this specification, in which similar letters of reference indicate corresponding parts in all the views.

Figure 1 is a side view of the form of retaining-strip which I employ in connection with my improved form of binder. Fig. 2 is a perspective view of a number of book-signatures, in each of which signatures there is infolded a binding-strip, the parts being represented as they appear prior to the application of the back, cover, and flexible binding-cord of the binder. Fig. 3 is a view of the flexible back or cover. Fig. 4 is a perspective view of a partially-bound book, the parts being represented as they appear prior to the tightening of the binding-cord; and Fig. 5 is a perspective view of a bound volume, the flexible back being, however, removed.

In the drawings above referred to, A represents the upper and D the lower cover of the binder, near the back edges of which covers there are formed a number of apertures, *e*, through which apertures there is passed a binding-cord, *c*, the cover A being provided with two outer apertures and four or more inner ones, while the cover D is provided with two outer and two inner apertures, the outer apertures of each cover being in register.

In connection with the covers and binding-cord I employ a flexible back, B, and retaining-strips *b*, the back B being formed with two or more transverse slits or slots, *d*, while the retaining-strips are formed with open loops. (Shown in Fig. 1, wherein the strip is represented as being formed from a wire blank centrally bent to produce the loop, which is U-shaped and open at one side.)

In binding a number of signatures by my method I first pass the ends of the binding-cord out through the two inner apertures of the cover D, and then lay each end of the cord back through the outer apertures of the said cover. I then pass the cords through the slots *d* of the back B, through the projections of the retaining-strips, which strips have been previously infolded in the signatures to be bound, the projections having been forced out through the rear fold of the signatures, while the main portions of the strips rest against the inner faces of said folds, as indicated by dotted lines in Fig. 2. After the binding-cord has been brought into engagement with the projections of the strips *b*, I fold the surplus material of the back B between the upper signature, C, and the cover A, and then draw the ends of the cords *c* out through the slots of the back B, and pass said ends through the outer apertures of the cover A, then in and out through the other apertures of said cover, bringing the ends of the cord to a position so that they may be tied together, as shown in Fig. 5.

When additional signatures are to be inserted, they are placed in the desired position, the cords *c* being slightly loosened at this time. After the signature to be bound has been placed in position, the cord *c* is drawn in the form of loops through properly-located slits that are formed in the back fold of the signature to be bound. Retaining-strips of the form shown in Fig. 1 are then passed through the indrawn loops of the binding-cord until the cord-loops rest in the U loops or projections of the binding-strips, after which the cord is again drawn tight and its ends are tied together. It is on account of the facility with which additional signatures may be inserted within and withdrawn from the binder, as above described, that I employ a retaining-strip formed of an open loop in connection with a flexible binding-cord.

Now, although I have described my binder as being arranged so that two retaining-strips are employed in connection with each signature to be bound, it will of course be understood that three or more loops could be so employed in connection with each signature by a proper organization of the covers and flexible back—that is, by increasing the cord-apertures in the back and adding to the slots or slits in the cover.

With such a binder as has been above described, and as is illustrated in the drawings, many advantageous results are obtained, among which results are the following: None of the margin of the signatures is used in the binding, and consequently the book may be opened to its fullest extent, and, as the retaining-strips have an extended bearing upon the signatures in connection with which they are employed, such signatures will be firmly held to place and will not be likely to be accidentally torn from their bound position. The flexible back or cover adds to the finish and appearance of the binder, serving as a back for the same, irrespective of the number of signatures bound between the covers, so that when the binder is used for the purpose of associating periodicals or newspapers the back has a finished appearance from the introduction of the first periodical to the completion of the volume; also, the facility of removing and replacing at will signatures from any part of the file without disturbing the other contents of the file—a result which can only be obtained by the use of retaining-strips formed of open loops and flexible yielding binding-cords; also, the extreme cheapness and simplicity of the two parts just mentioned in obtaining the desired results.

Having thus fully described my invention, I claim as new and desire to secure by Letters Patent—

1. In a binder, the combination, with a cover, of a retaining-strip formed with an open loop and a flexible yielding cord, substantially as described.

2. The combination, with a pair of covers formed with apertures, of a transversely-slotted flexible back, retaining-strips formed with open loops, and a flexible yielding binding-cord, all parts being arranged substantially as described.

NEHEMIAH HAWKINS.

Witnesses:
EDWARD KENT, Jr.,
C. SEDGWICK.